UNITED STATES PATENT OFFICE.

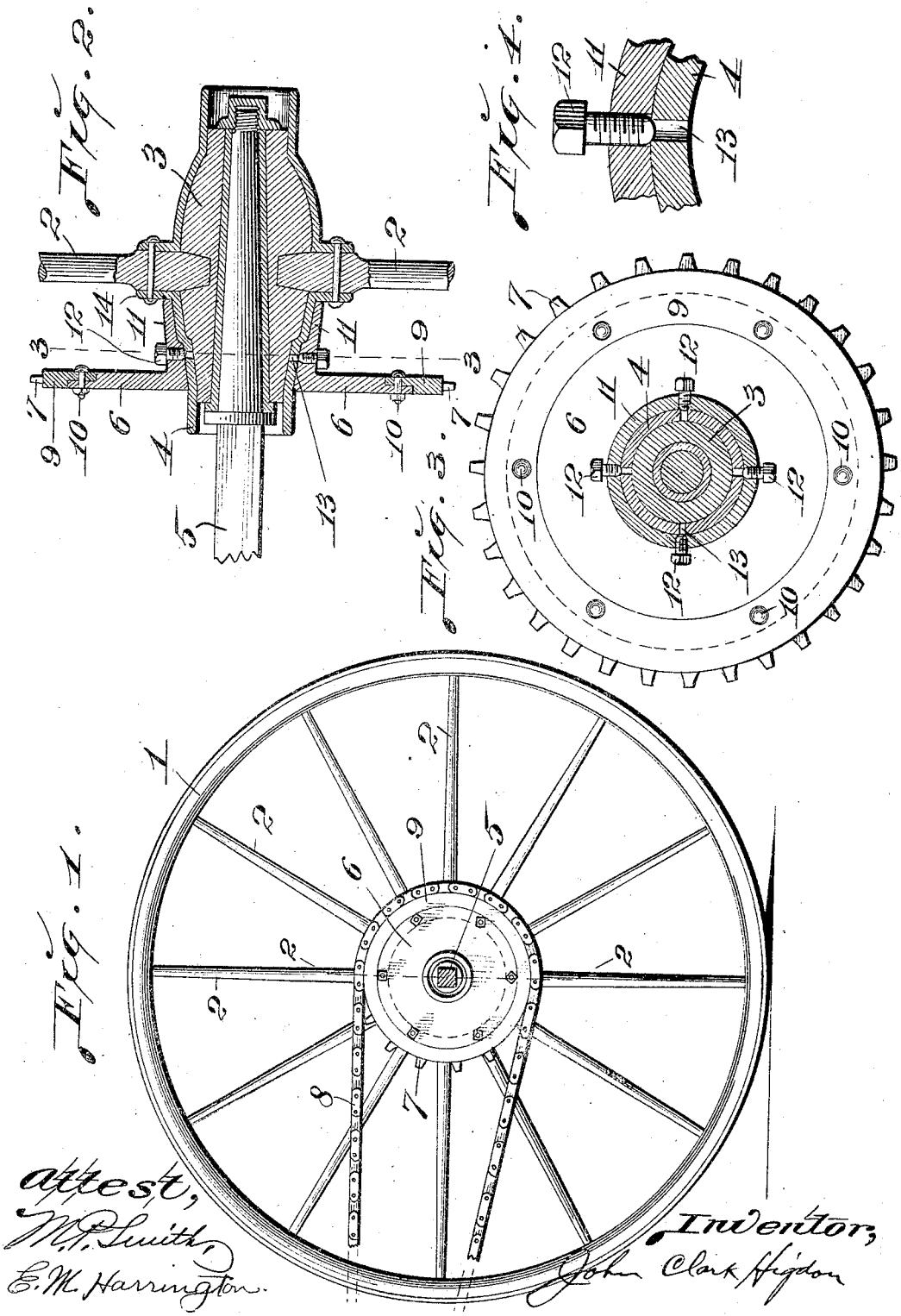

JOHN CLARK HIGDON, OF ST. LOUIS, MISSOURI.

AUTOMOBILE-WHEEL.

No. 822,665.

Specification of Letters Patent.

Patented June 5, 1906.

Application filed September 23, 1905. Serial No. 279,839.

*To all whom it may concern:*

Be it known that I, JOHN CLARK HIGDON, a citizen of the United States, and a resident of St. Louis, Missouri, have invented certain new and useful Improvements in Automobile-Wheels, of which the following is a specification containing a full, clear, and exact description, reference being had to the accompanying drawings, forming a part hereof.
My invention relates to automobile-wheels; and it consists of a novel construction and arrangement hereinafter specified, and pointed out in the claims.

The object of my invention is to provide an improved mechanism whereby motive power may be applied to the hubs of common buggy and wagon wheels in order that said vehicles may be very quickly converted into automobiles.
In the drawings, Figure 1 is a sectional side elevation of the inner side of a common vehicle-wheel with my invention applied thereto. Fig. 2 is a vertical enlarged section taken on the line 2 2 of Fig. 1. Fig. 3 is a detail section taken on the line 3 3 of Fig. 2. Fig. 4 is a detail view of a portion of the metal casing which incloses the hub and the clamping means for securing the gear-socket thereto.

In carrying out my invention I prefer to apply the same to what are known as the "Sarven" patent wheels, as such are provided with hubs which are incased in metal.

1 indicates a wheel having the usual spokes 2, wooden hub 3, and metal casing 4, incasing the wood portion of the hub.

5 indicates the usual axle.

6 indicates a gear-wheel which in this instance is provided with sprocket-teeth 7 at its periphery to be engaged by the sprocket-chain 8 for the purpose of applying power to the said wheel. The body of the wheel 6 and the annular portion 9, carrying the teeth 7, may of course be formed integral or they may be of separate pieces and secured together by bolts or rivets 10. In the latter case the united parts are preferably rabbeted together, as shown in Fig. 2, and the bolts or rivets 10 are passed through the overlapping flanges. By this construction I can readily increase or decrease the diameter of the gear-wheel by merely removing the teeth-carrying annular ring 9 and replace the same with one having a greater external diameter. Projecting from one side of the said gear-wheel body is an outwardly-flaring socket 11, which fits over the inner end of the hub and is clamped thereon by means of the screws or bolts 12, which are threaded through the thickest portion of the said socket at a point near the body of the gear-wheel, and the inner ends of said screws are preferably rounded, so that they will project slightly within the outer ends of the corresponding holes or recesses 13, formed in the metal hub-casing 4. The rounded ends of said screws are forced into the said holes 13, and thereby prevent the socket and gear-wheel from turning on said hub and also prevent its axial withdrawal therefrom. I have found that by making the holes 13 slightly smaller than the rounded ends of the screws I get better clamping results than if the holes were large enough to freely receive the screws. The said socket 11 and the gear-wheel 6 are preferably formed integral, as shown. The outer end of the socket 11 has a greater diameter than its inner end and preferably rests in contact with the adjacent metal spoke-flange 14.

By means of the devices above described motive power may be readily applied to the wheels of a common buggy or wagon, and such vehicles may be readily converted into automobiles, it being only necessary to connect the chain 8 to a suitable motor carried by the vehicle.

What I claim is—

1. In an automobile, a hub-clamp in the form of a flaring socket clamped upon the inner end of a vehicle-hub independently of the wheel-spokes, and a toothed wheel carried by said socket; substantially as specified.

2. In an automobile, a toothed wheel having an outwardly-flaring socket on one of its sides for engaging the hub of a vehicle-wheel, and means for clamping the same upon said hub; substantially as specified.

3. In an automobile, a toothed wheel having an outwardly-flaring socket on one of its sides for engaging the hub of a vehicle-wheel, and radial screws, or bolts, for clamping the same upon said hub independently of the wheel-spokes; substantially as specified.

4. In an automobile, the combination with a vehicle-wheel having a metallic hub, in the periphery of which are formed restricted holes, or openings, of a toothed wheel having at one side an outwardly-flaring clamping-socket, and screws threaded through said socket and engaging the said restricted openings in the said hub; substantially as specified.

5. In an automobile, the combination with a vehicle-wheel having a metallic hub, in the periphery of which are formed restricted holes, or openings, of a toothed wheel having at one side an outwardly-flaring clamping-socket, screws threaded through said socket and engaging the said restricted openings in the said hub, a detachable ring carrying the teeth of said gear-wheel detachably rabbeted to the body, and bolts, or rivets, passing through the overlapping rabbeted parts substantially as specified.

In testimony whereof I have signed my name to this specification in presence of two subscribing witnesses.

JOHN CLARK HIGDON.

Witnesses:
M. P. SMITH,
E. M. HARRINGTON.